No. 841,270.
W. B. POTTER.
ELECTRIC MOTOR DRIVE.
APPLICATION FILED MAR. 21, 1904.
PATENTED JAN. 15, 1907.
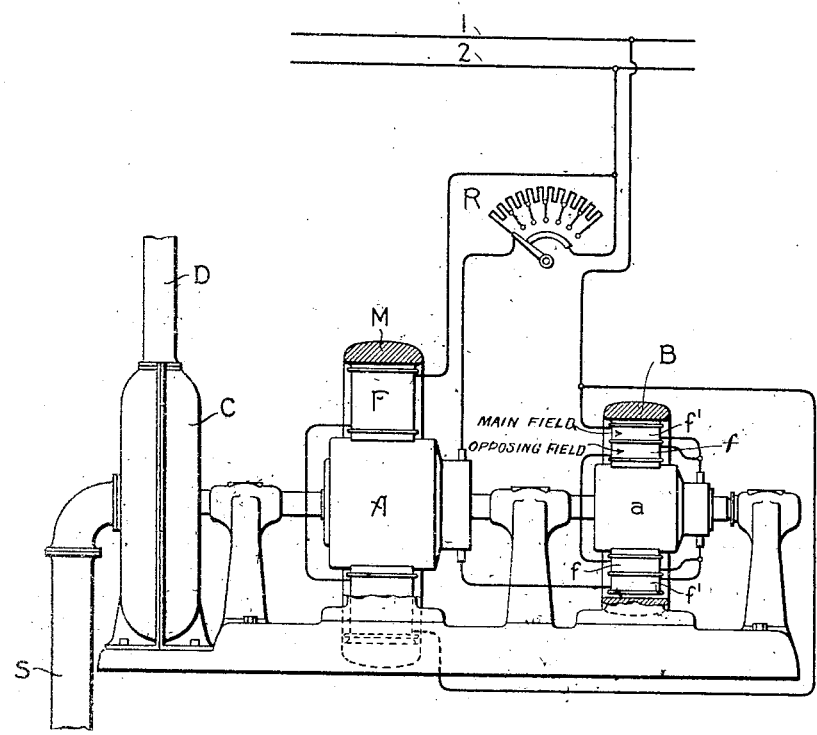
Witnesses.
Inventor.
William B. Potter.
by Albert G. Davis
Att'y.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

ELECTRIC MOTOR-DRIVE.

No. 841,270.     Specification of Letters Patent.     Patented Jan. 15, 1907.

Application filed March 21, 1904. Serial No. 199,161.

*To all whom it may concern:*

Be it known that I, WILLIAM B. POTTER, a citizen of the United States, residing at Schenectady, in the county of Schenectady and State of New York, have invented certain new and useful Improvements in Electric Motor-Drives, of which the following is a specification.

My invention relates to electric motor-drives, and has particular reference to electric drives for machines in which it is desirable that the speed should increase with the mechanical output or load. Such is the case, for instance, with a rotary pump supplying a jet or siphon condenser. Before the vacuum is formed the lift may be five or six times greater than when the condenser is working with proper vacuum. Before the vacuum is formed not only is the required output of the motor much greater than during normal running conditions due to the increased lift, but it is also necessary that the speed of the pump should be increased in order to accomplish the necessary lift.

Two arrangements of motor-drive that are well known in the art and that may be arranged to give increasing speed with increasing output are the differentially-wound motor and the shunt-motor with series booster. Such devices are described in Patent No. 555,191, Thomson, dated February 25, 1896. Both of these devices, however, are unstable on heavy loads, tending to race and heavily overload themselves. To meet this difficulty, the Thomson patent describes an arrangement of the booster-field such that it becomes saturated on heavy loads.

My invention consists in the combination of a shunt-motor and a differential booster in series with it, the series winding of the booster normally predominating, and the shunt-winding serving to limit the booster-voltage at high speeds, and consequently to prevent racing.

My invention will best be understood by reference to the accompanying drawing, which shows somewhat diagrammatically a motor-drive arranged in accordance with my invention.

C represents a rotary pump taking water from the suction-pipe S and delivering it through the delivery-pipe D. Rotary pump C is driven by the shunt-motor M, the shunt-field F of which is connected across the constant potential source of supply 1 2. The armature A of motor M is connected to line-wire 2 through the usual starting-rheostat R and is connected to line-wire 1 through the differential booster B, the armature $a$ of which is mounted on the shaft of motor M. The differential booster B has its armature $a$ and series field $f'$ connected in series with armature A of motor M. Booster B also has a shunt-field $f$ connected across the terminals of its armature $a$. The series field of the booster is properly connected so as to increase the voltage impressed upon the armature A, while the shunt-field is wound to reduce this voltage.

The two fields are so proportioned that under normal operation of motor A the shunt-field $f$ is overpowered and the booster B acts as a series booster, impressing an increasing voltage on the terminals of the shunt-motor with increasing output, and thereby increasing the speed. The shunt-field serves merely to limit the booster effect of the machine and becomes predominant only at high speeds. The reason for the varying relative influence of the series and shunt fields will be understood when the effect of speed variations on these two fields is taken into consideration. The strength of the series field is not affected directly by the speed, but is determined always wholly by the current flowing through the booster and is affected by the speed only as the speed affects the output. The shunt-field, on the other hand, is dependent upon the induced armature voltage in the booster, which depends upon the product of the speed and the resultant booster-field, and consequently increases with increase of speed much more rapidly than the series field. Therefore the two windings may readily be so proportioned that the shunt-field exerts a very small influence under normal operation, but comes into play effectively to limit the maximum speed of the motor, so as to prevent racing and serious overloading.

I do not desire to limit myself to the particular construction and arrangement of parts here shown, but aim in the appended claims to cover all modifications which are within the scope of my invention.

What I claim as new, and desire to secure by Letters Patent of the United States, is—

1. In combination, a shunt-motor, a member driven thereby, and a differential booster driven by said motor having its shunt-field connected directly in shunt to its armature and adapted to raise the voltage impressed on said motor up to a certain limit as the load on said motor increases.

2. In combination, a shunt-motor, a member driven thereby, and a differential booster driven by said motor and connected in series with the armature of said motor, said booster having its shunt-field connected directly in shunt to its armature.

3. In combination, a shunt-motor, a member driven thereby, and a differential booster driven by said motor and in series therewith and having its series coil connected to raise the voltage on the motor, and a shunt-field connected directly in shunt to its armature.

4. In combination, a shunt-motor, a member driven thereby, and a booster driven by said motor and having its armature and a series field-winding in series with the armature of said motor and connected to increase the voltage upon said armature, and having a shunt-field connected across the booster-armature in opposition to the series field to limit the increase of voltage.

5. In combination, a shunt-motor, a member driven thereby, and a differential booster having its armature and series field in series with the armature of said motor and having its shunt-field so connected as to increase in strength with increase of the booster voltage.

6. In combination, a shunt-motor, a member driven thereby, and a differential booster in series therewith having its series coil connected to increase the voltage impressed on the motor-terminals, and having its opposing shunt-field so connected as to increase in strength with increase of the booster voltage.

7. In combination, a shunt-motor, a member driven thereby, a differential booster in series therewith having its series coil proportioned to preponderate normally and connected to increase the voltage impressed on the motor, and a shunt-coil so connected as to increase in strength with increase of the booster voltage and proportioned to balance the series field when the booster voltage increases to a certain limit.

In witness whereof I have hereunto set my hand this 19th day of March, 1904.

WILLIAM B. POTTER.

Witnesses:
 BENJAMIN B. HULL,
 HELEN ORFORD.